C. H. FOX.
INTERNAL COMBUSTION ENGINE.
APPLICATION FILED SEPT. 24, 1907.
1,077,956.
Patented Nov. 4, 1913.
6 SHEETS—SHEET 1.
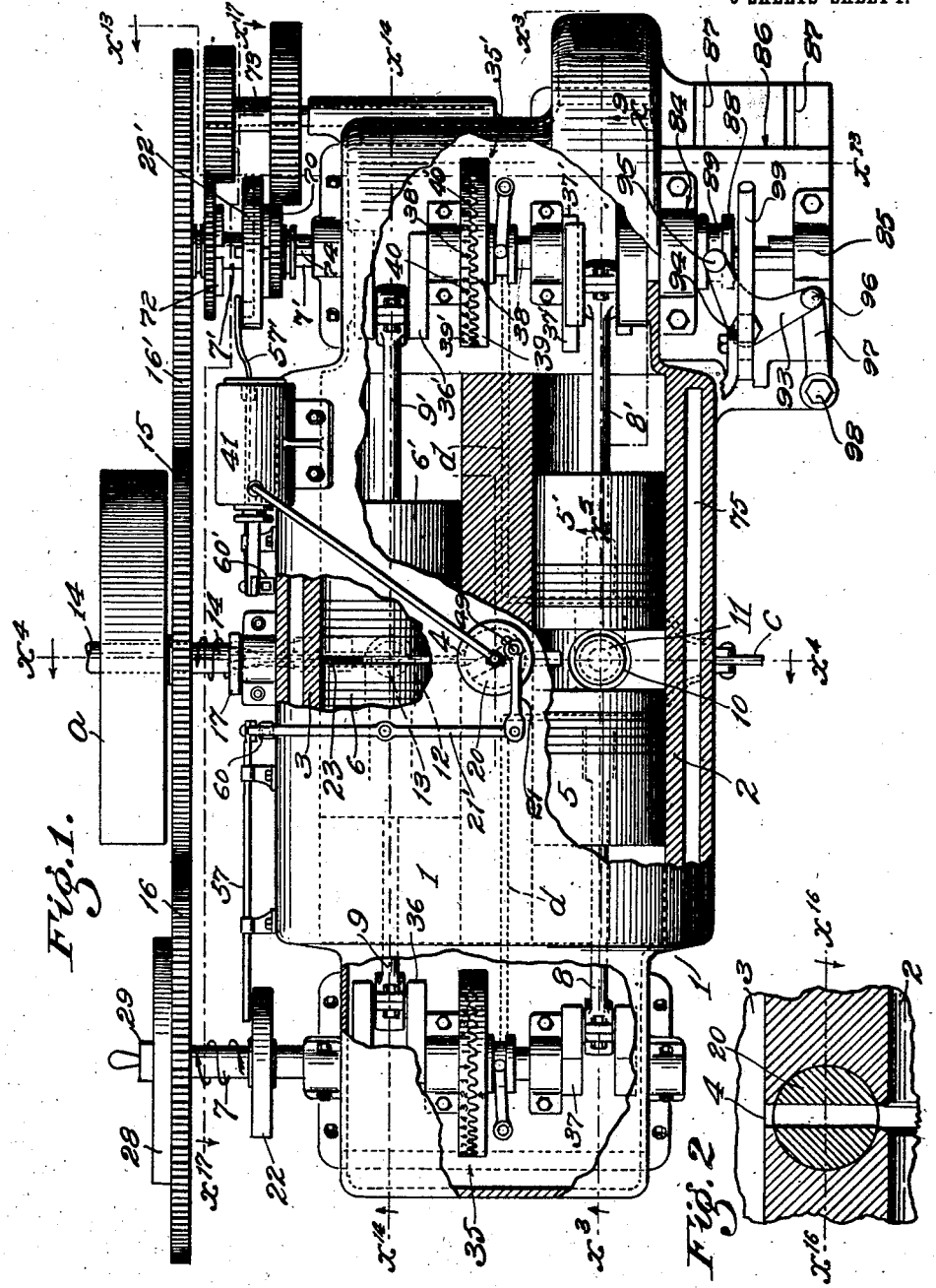
Witnesses
C. C. Holly.
J. Townsend.
W. N. Bixby.
Inventor
Charles H. Fox.
by James R. Townsend
his atty C. H. FOX.
INTERNAL COMBUSTION ENGINE.
APPLICATION FILED SEPT. 24, 1907.
1,077,956.
Patented Nov. 4, 1913.
6 SHEETS—SHEET 2.
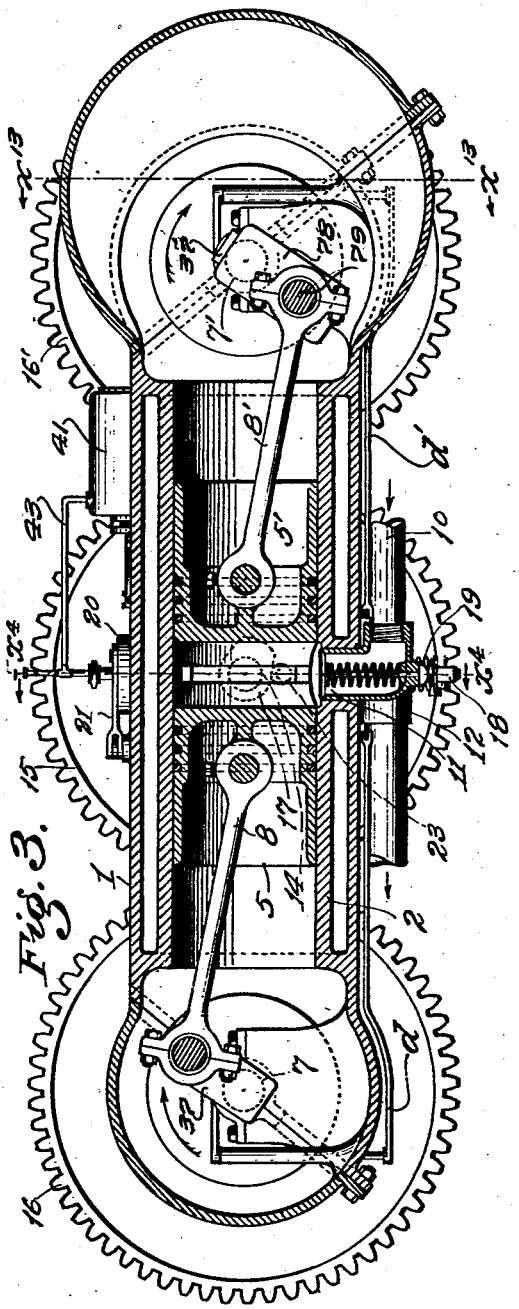
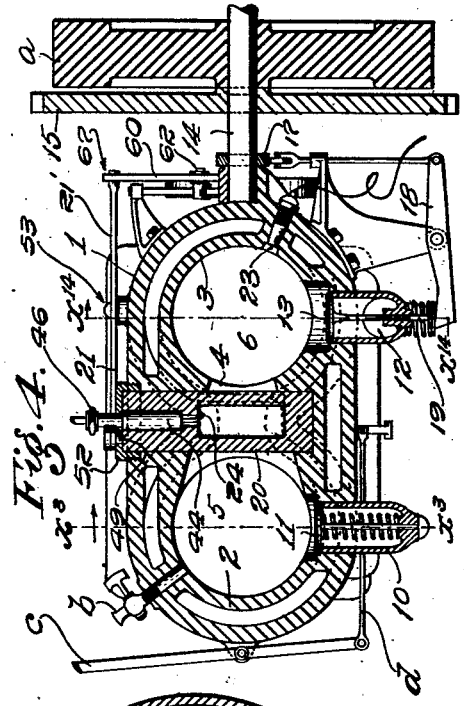
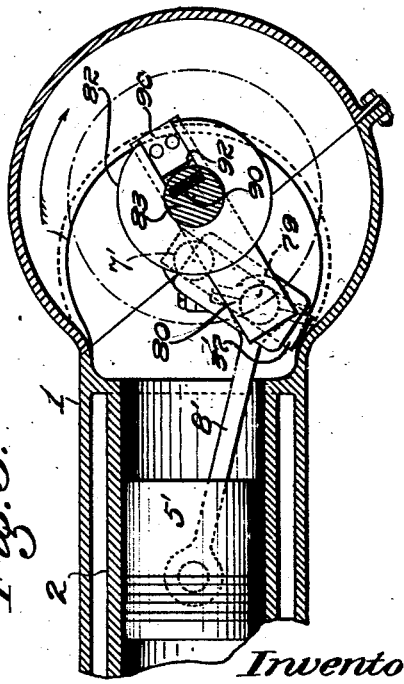
Witnesses
C. C. Holly
J. Townsend
Inventor
Charles H. Fox.
by James R. Townsend
his atty

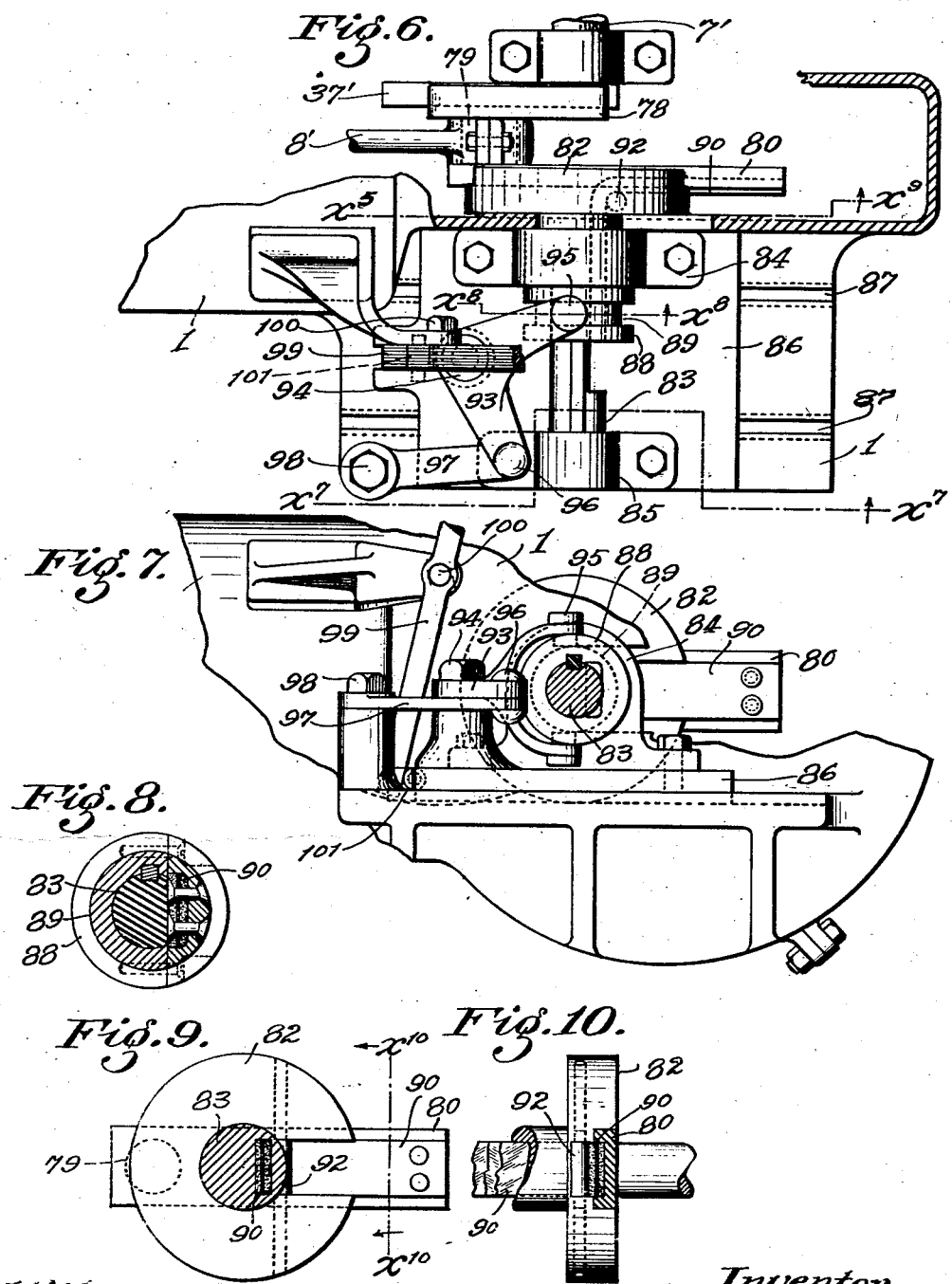

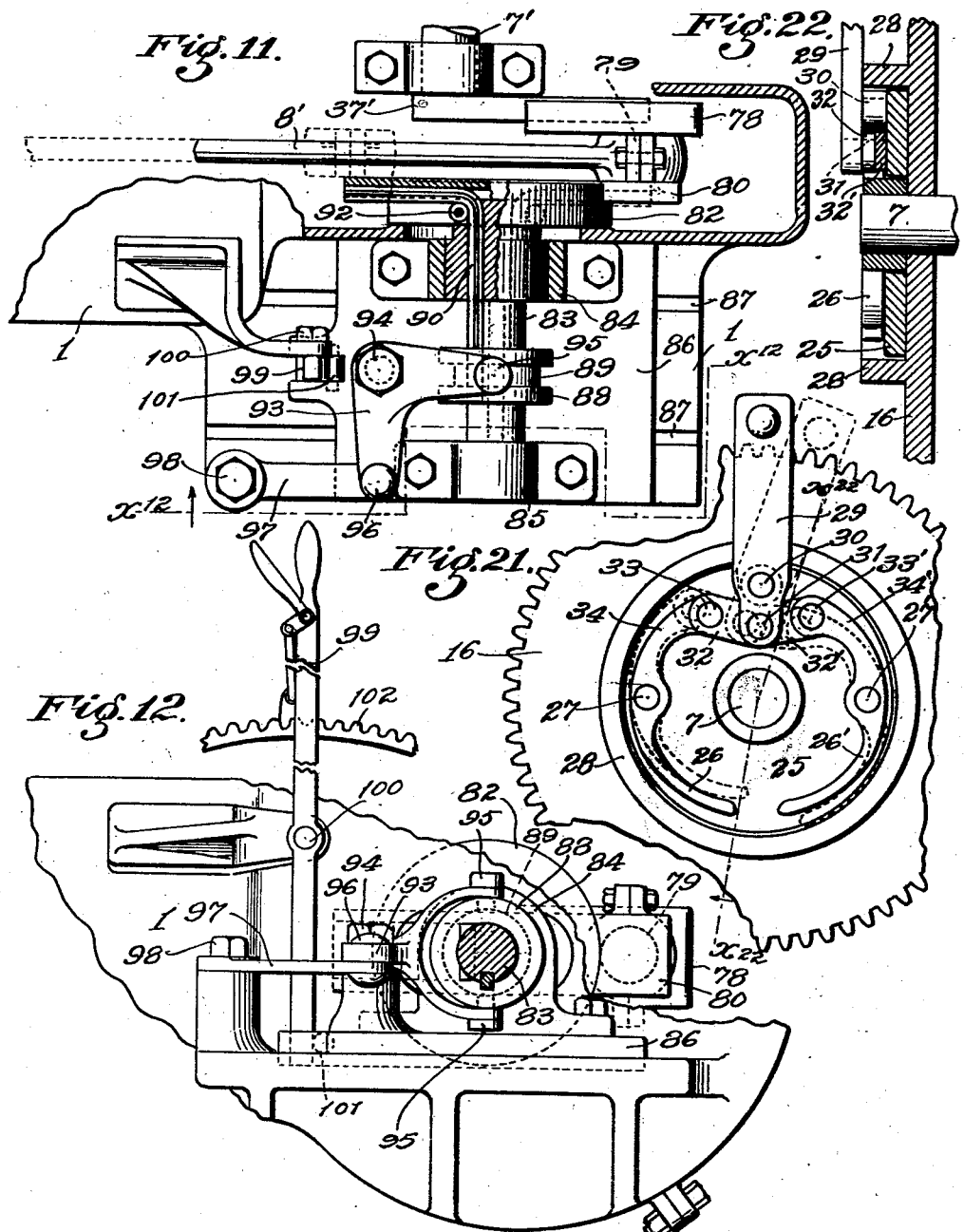

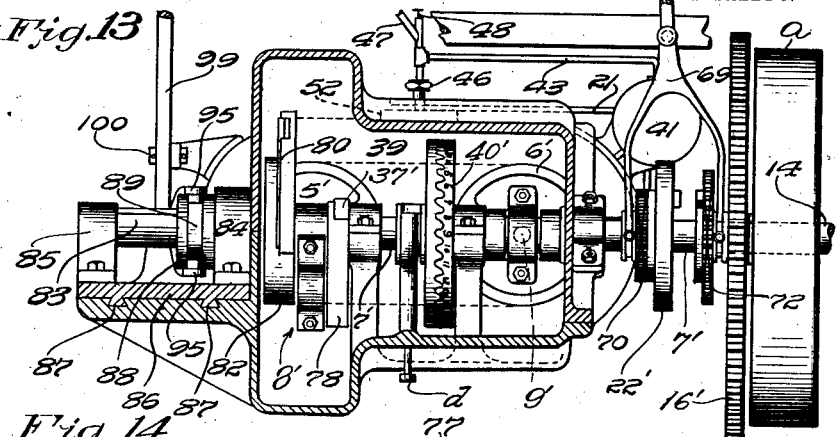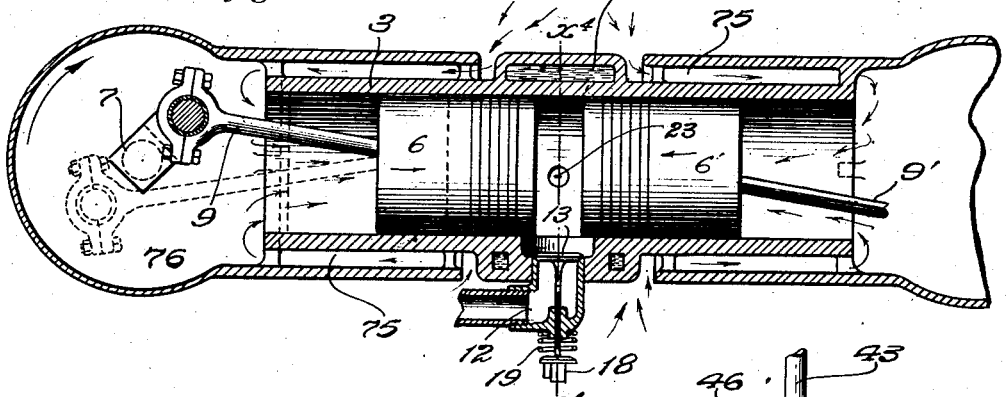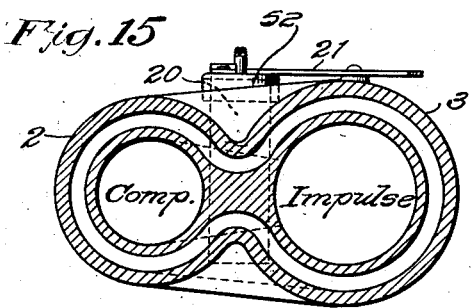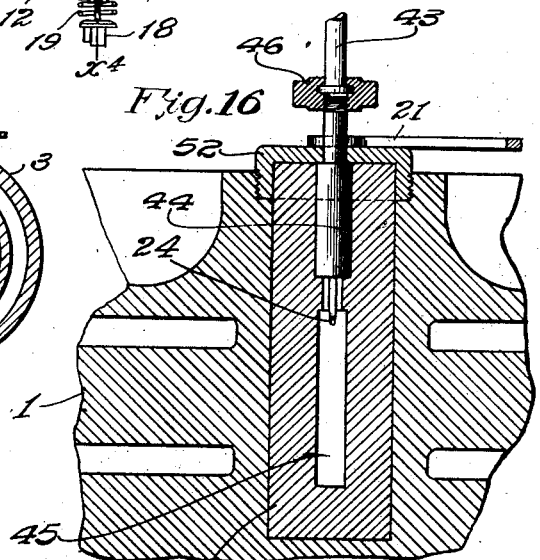

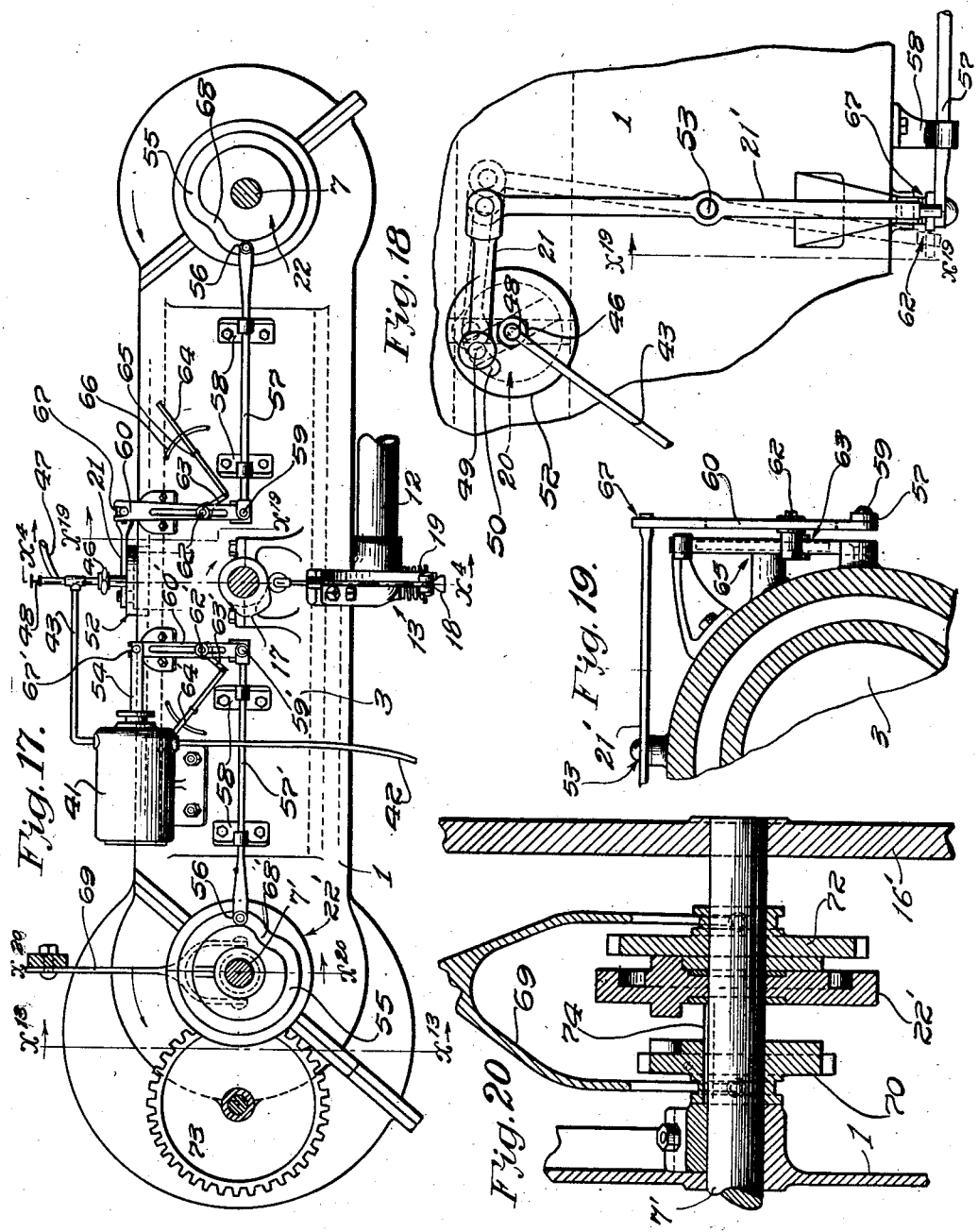

UNITED STATES PATENT OFFICE.

CHARLES H. FOX, OF BAKERSFIELD, CALIFORNIA.

INTERNAL-COMBUSTION ENGINE.

1,077,956. Specification of Letters Patent. Patented Nov. 4, 1913.

Application filed September 24, 1907. Serial No. 394,417.

*To all whom it may concern:*

Be it known that I, CHARLES HENRY FOX, a citizen of the United States, residing at Bakersfield, in the county of Kern and State of California, have invented a new and useful Internal-Combustion Engine, of which the following is a specification.

An object of this invention is to provide an internal combustion engine capable of economically generating varied power at the will of the operator.

Other objects are:—to provide novel means for the use of water for cooling and combustion purposes; to provide for combustion of the hydrogen gas by cumulative action of gas having a lower temperature of combustion; to effect the exhaust in such manner as to thereby assist in cooling the engine.

An object in view is to provide an engine whereby an accurate determination can be readily had of the comparative effectiveness of various mixtures of air and fuel and various degrees of compression so as to enable a manufacturer to determine the requisites for the most effective engine for a determined kind or quality of fuel.

This invention is an improvement in numerous features among which may be mentioned: 1. The complete expulsion of the burnt gases by piston displacement and the compression at the same time of a succeeding charge at each inward stroke of the compression piston. 2. The introduction and ignition behind the impulse piston of a part of a compressed charge, and then the application of the force of the resulting explosion to introduce into the combustion chamber behind the receding piston, the remainder of the charge, being now highly compressed, thus continuing the combustion as the impulse piston recedes. 3. The introduction to the impulse chamber of fuel at the charging port by means of air compressed by the force of combustion at the same time taking place in said chamber. 4. The provision of adjustable means for producing the explosive mixture at the charging port or in the impulse chamber at the will of the operator. 5. Interchangeability from two-cycle to four-cycle and vice versa at the will of the operator while the engine is in operation.

Provision is made whereby water may be used in connection with carbonaceous or other fuel for the purpose of being: First: used as a cooling agent while being vaporized as it passes in with the fuel from the lower end of the nozzle; second: as an explosive, after having been changed to gases by pressure and heat; and third: as a cooling agent after being exploded as it will be immediately and instantly converted first back to water again and then into steam and then will be passed out with the exhaust.

The invention includes the engine and the various parts and combinations of parts hereinafter more particularly set forth.

Other advantages and objects may appear from the subjoined detail description.

The accompanying drawings illustrate the invention.

Figure 1 is a plan of an engine constructed in accordance with this invention, portions being broken away to expose interior construction. The parts are adjusted for equal stroke of all the pistons. Fig. 2 is a fragmental plan section showing arrangement of the compressor and impulse chambers, and the charging valve between said chambers. Fig. 3 is a longitudinal section through the compressor on line $x^3$—$x^3$, Figs. 1 and 4. Fig. 4 is a section on line indicated by $x^4$—$x^4$, Figs. 1, 3, 14 and 17, showing the valves closed. Fig. 5 is a detail section on line indicated by $x^5$—$x^9$, Figs. 1 and 6 showing the parts adjusted to cause one of the compressor pistons to make a stroke longer than that of an impulse piston. Fig. 6 is an enlarged fragmentary detail plan of the variable stroke mechanism whereby the length of stroke of one of the compressor pistons may be increased and decreased at the will of the operator. The adjustment is the same as in Fig. 1. Fig. 7 is a sectional elevation from line $x^7$—$x^7$, Fig. 6. Fig. 8 is a sectional detail on line $x^8$—$x^8$, Fig. 6, omitting the bell crank. Fig. 9 is a sectional detail on line $x^5$—$x^9$, Fig. 6. Fig. 10 is an elevation from line $x^{10}$—$x^{10}$, Fig. 9. Fig 11 is an enlarged detail of the means for adjusting the length of stroke of one of the compressor pistons to vary the compression and the volume of the charge of air. The parts are shown in position at the close of the inspiration and as adjusted to afford the maximum retraction at the close of the inspiration. Portions of the boxing and case are sectioned. Fig. 12 is a sectional elevation from line $x^{12}$—$x^{12}$, Fig. 11. Fig. 13 is an elevation from right of Figs. 1 and 3 and from left of Fig. 17 cutting the end cap on line indicated by $x^{13}$, Figs. 1 and 3, to expose the mechanism for changing the cycle and for changing the amount of compression in the impulse chamber. Fig. 14 is a section on line indicated by $x^{14}$—$x^{14}$, Figs. 1 and 4 showing the combined air and water jacket which may be applied to either or both the cylinders. Arrows indicate inspiration of cooling air at the instroke of the pistons. Fig. 15 is a cross section of the two cylinders to show clearly that the compressor cylinder may be of less diameter than the impulse cylinder and that the cooling jacket may be unitary to inclose both cylinders. It may be assumed that this section is at a line, not shown between middle and the right end of the cylinders. Fig. 16 is a fragmental axial sectional detail of the charging valve on line indicated by $x^{16}$—$x^{16}$, Fig. 2, showing the valve open. Fig. 17 is an elevation from the rear of Fig. 1 and the right of Fig. 4, omitting the flywheel and other parts shown at the top or rear of Fig. 1 above line $x^{17}$—$x^{17}$, in said Fig. 1. Fig. 18 is a plan of the charging valve and a portion of the mechanism for operating the same. Fig. 19 is a fragmental sectional elevation from line indicated by $x^{19}$—$x^{19}$, Figs. 17 and 18 to illustrate the adjustable valve operating mechanism. Fig. 20 is a fragmental sectional detail, looking right from line $x^{20}$—$x^{20}$, Fig. 17, illustrating the mechanism for changing from two cycle to four cycle operation. Fig. 21, Sheet 4, is a fragmental detail of the means for starting the engine in either direction. Fig. 22 is a fragmental section on line $x^{22}$, Fig. 21.

1 is the frame of the engine; 2, the compressor cylinder or chamber, and 3 an impulse or combustion cylinder or chamber. 4 is a valved charging port communicating between said cylinders midway of their length.

5 and 5' are the compressor pistons in the compressor cylinder 2.

6 and 6' are the impulse pistons in the impulse cylinder 3.

7 and 7' are crank shafts at the opposite ends of the engine. 8 and 8' are compressor piston rods connected with said crank shafts respectively. 9 and 9' are impulse piston rods likewise connected with the crank shafts.

10 is the inlet port, and 11 the inlet valve.

12 is the exhaust port, and 13 the exhaust valve.

14 is the power shaft which may be connected with the crank shafts by any suitable means as the power shaft gear 15 and crank shaft gears 16 and 16'.

17 is the exhaust operating cam on the power shaft.

18 is the exhaust valve lever operated by said cam to open the exhaust valve 13 against the pressure of the exhaust valve spring 19 which normally closes the valve.

20 is the charging valve which is opened by the charging valve rod 21, connected to the charging-valve by the link 21', and operated by cam 22. The mechanism for operating the charging valve is timed to open the charging port immediately after the impulse pistons begin to recede from each other and at the latter part of the inward strokes of the compressor pistons so that the charge between the compressor pistons will be expelled from the compressor chamber into the increasing space between the impulse pistons, and the charging port will be closed behind the charge at the instant the compressor pistons begin to recede from each other.

23 designates an electrical igniter in the form of a hot wire arranged to ignite the charge in the impulse chamber.

The operation of the engine thus far described is as follows:—By rocking the crank shafts the compressor pistons 5 and 5' may be made to suck in a partial charge of air and expel the same from the compressor chamber through the charging port 4 where a quantity of fuel is supplied to the air by suitable means as by a nozzle 24, whereupon an explosive charge is driven into and across the impulse chamber where it will be ignited by the hot wire, thus causing an explosion. An impulse will thus be given to the impulse pistons 6 and 6' to drive the engine in the direction in which the fly-wheel $a$ is at that time moving, that being the direction of least resistance. The compressor pistons 5 and 5' will at each successive revolution of the crank shafts take in a full charge of air and expel the same with a further charge of fuel into the impulse chamber where it will be fired by the igniting device. The economy of effort in thus starting the engine is apparent, as it is only necessary to take in a sufficient charge to give the compression under which the explosive mixture will burn when ignited by the hot wire, and immediately thereafter the compression of further charges in operating the engine is accomplished by the force of the internal combustion applied through the impulse pistons, the flywheel, and the crank shafts to the compressor pistons.

$b$ is a pet-cock for the compressor chamber to enable the operator to allow a portion of air contained therein to escape from the compressor chamber in case the engine at any time comes to a stand still when the compressor pistons are at the end of their outward stroke. The object being to relieve the pressure and allow the engine to be easily started. In such case the pet-cock $b$ may be opened while the crank shafts are being rocked thus to allow the pistons 5 and 5' to approach each other until there remains between them a charge sufficiently light. Then the pet-cock will be closed and the rocking of the crank-shaft may then be accomplished as stated to drive the charge into the impulse chamber. The engine may thus be easily started into operation.

In order to readily rock the crank shaft in either direction for the purpose of starting the engine, there is provided a starting device illustrated in Figs. 21 and 22, in which 25 is a body rotatable on the crank shaft 7, and 26, 26′ designate two friction shoes pivoted to said body by pivots 27, 27′ and adapted to frictionally engage a collar 28 that is fixed to the crank shaft 7. 29 is a lever pivoted by a pivot 30 to the body 25, and by pivot 31 to two links 32 and 32′ which are respectively pivoted by pivots 33 and 33′ to arms 34 and 34′ of the shoes 26 and 26′. Said arms are on opposite sides of the pivots 27, 27′ from the friction shoes 26, 26′, so that when the free end of the lever 29 is swung toward either of the shoes, such shoe will be forced into frictional contact with the collar 28, while the other shoe will be swung away from the collar 28. The friction between the collar and the shoe that engages it is sufficient to rotate the collar, and consequently the crank shaft 7, in the direction toward which the free end of the lever 29 has been swung. By this means the crank shaft may be turned sufficiently to charge the impulse chamber to a degree requisite for an explosion in the impulse chamber and consequently a starting of the engine in the direction in which the crank-shaft has been turned by the means stated.

When the power from the impulse pistons is effective to continue the rotation of the crank shaft in the direction in which it has been started, the collar 28 being thus turned in such direction escapes the frictional contact of the shoe. When the starting lever 29 stands in position to hold the pivots 30 and 31 in a line that is at right angles to the line drawn through the pivots 27, 27′, both of the shoes are released. Any suitable means may be provided if necessary, to hold the lever in this intermediate position.

The arms 34, 34′ of the shoes are constructed to clear the collar 28 in all positions into which the lever 29 may be swung so that they will not prevent the shoes from contacting with the collar 28. The collar-engaging faces of said shoes are of the same radius as the inside face of the collar and each is adapted to fit the collar when its shoe is swung into locking position. 35, 35′ designate clutches in the crank-shaft between the impulse cranks 36, 36′, and the compressor cranks 37, 37′. c designates a common lever connected by rods d, d′, to simultaneously operate the two clutches, thereby allowing the impulse cranks 36, 36′ to be turned independently of the compressor cranks 37, 37′, thus to adjust the impulse pistons relative to the compressor pistons for the purpose of increasing or decreasing the amount of pressure to which the air in the compressor chamber will be subjected at the time the impulse pistons begin to separate to receive the charge; and also to adjust the impulse pistons to such position relative to the compressor pistons as may be necessary to cause the engine to run in the direction desired.

Indicators may be provided to enable the operator to readily determine the required adjustment. Such indicators are shown in Fig. 1 where 38, 38′ designate marks on the two members 39, 39′, respectively.

40 and 40′ designate two sets of digits respectively arranged on opposite sides of the index mark 38 on one of the clutch members of each clutch. These indicating marks are so arranged relative to the wrist-pins of the cranks that when the indexes 38, 38′ are adjacent each other the compressor and impulse pistons will come to dead center at the same time.

In case the pistons are all brought to center line, thus bringing the indexes 38 and 38′ adjacent to each other, then by releasing the clutches from each other and turning the impulse cranks 36, 36′ to bring the index 38 to the digit of one or the other set 40 or 40′, the impulse pistons may be simultaneously withdrawn from the center line a determined distance with the impulse crank either below or above dead center, as the case may be. Then the clutches may be engaged and when the engine is started into operation it will run in the direction determined by the setting just above described.

It is found in practice that in order to secure the most perfect combustion, the volume of air supplied to the impulse chamber should be insufficient to fill the chamber at atmospheric pressure when the pistons are at the extreme outer stroke; and consequently it is unnecessary to make the compressor cylinder 2 of as great diameter as the impulse cylinder 3, the stroke of the several pistons 5, 5′ and 6, 6′ being of equal length.

The charging port 4 is of such area as to allow the charge of air to pass therethrough at such velocity as may be deemed advisable. Preferably, said port is tapered, as shown in Fig. 4, and the orifice of the port in the wall of the impulse chamber is as small as may be deemed practicable; the purpose being two-fold, namely,—by this form the air issues into the impulse chamber as from the end of a nozzle and, together with the fuel carried thereby, is directed across said chamber to the hot wire 23 which is preferably located diametrically across the impulse chamber from said orifice. A second purpose in making the orifice into the impulse chamber as small as practicable is to minimize the tendency to transmit the force of the explosion to impede the inward movement of the compressor pistons.

It is to be noted that in the practical operation of this engine a charge of air and fuel is forced into the combustion or impulse chamber 3 during the earlier part of the impulse stroke and while combustion is taking place in the impulse chamber; said charge being forced into said chamber by the direct effect of the combustion in such chamber, the power being transmitted through the impulse pistons, their rods, the crank shaft, the compressor pistons and their rods; the principle being that the forces of the explosion are directly applied against the large areas of the receding impulse pistons, and in any event could not be effective upon the compressor pistons until after having passed through the comparatively very small orifice of the charging port.

The impulse pistons recede from each other under the impulse, not only of the explosion, but also under the impulse of the momentum of the fly-wheel and of all the pistons and piston rods; therefore, all the forces combine to expel the air from between the compressor pistons through the port and charging valve into the impulse chamber, thereby carrying the charge of fuel into the body of burning, highly-heated, high tension gases, and there the combustion takes place continuously as it is supplied by the fuel and air thus injected. This action tends to take up some of the heat of the first combustion to effect an expansion of new fuel and air, thus tending to prevent excessive heating of the combustion chamber. Furthermore, the combustion is by this method and means caused to take place in a limited space,—namely, at the middle of the chamber where the fuel is gradually introduced; consequently, the tendency to heat the greater body of the cylinder walls is reduced, and as the area subject to heating is also subject to the cooling action of the expanding air and fuel, the tendency to loss of heat is minimized.

As the explosion takes place, the pressure in the impulse chamber becomes very great, and consequently the charge of air and fuel can only enter such chamber under a correspondingly great pressure. The compressor pistons are therefore so set that their cycle follows that of the impulse pistons in such relation that the compressor piston will expel practically all the air from the compressor chamber at an early part, say, the first, fourth or third of the impulse stroke, during which time the material for the combustion is supplied and the ignition thereof takes place under the high pressure and heat caused by the earlier combustion.

The fuel may be fed into the impulse chamber in any suitable manner. In the form shown, 41 (see Fig. 17), designates a fuel pump supplied through a pipe 42 and connected by a pipe 43 with a rotatable hollow stem 44 which carries at its lower end the bent nozzle 24 arranged to discharge into the way 45 through the charging valve 20. The purpose of making the stem 44 and the bent nozzle rotatable is to direct the fuel, either immediately into the impulse chamber and across the same onto the hot wire 23, or, at the will of the operator to direct the fuel onto a wall of the engine, as for instance the wall of the ways 45 of the valve. By discharging the fuel against a wall the operator may control to a greater or less extent the vaporizing of the fuel before it reaches the igniter. Where crude petroleum or other low gravity hydrocarbon is used, the same may be directed onto the wall of the valve down which it may flow, until carried away by the on-rush of air from the compressor chamber, thus effecting a vaporizing of the heavy oil. In the case of fuel of lighter gravity, as gasolene, alcohol, or the like, the fuel may be directed toward and onto the igniter by turning the nozzle so as to discharge through the valve way.

The position of the nozzle need only be changed from time to time as changes are made in the kind of fuel used in the engine.

46 is a union to connect the pipe 43 with the hollow stem 44. By screwing and unscrewing the union the stem can be tightened or loosened, so that it may be turned to bring the nozzle to the desired position.

47 is a water pipe controlled by a needle valve 48 to supply water to the nozzle along with the fuel when that is deemed advisable or expedient by the operator. The purpose of thus supplying water may be to cool the valve and the impulse chamber and to increase the combustion of certain hydrocarbon fuels.

The effect of thus introducing the water may be: First: a cooling of the valve by evaporation as the air takes up the water and carries it into the impulse chamber; second: a probable decomposition of the water into its component gases by reason of the heat and pressure caused by the combustion of the hydrocarbon fuel; third: the combustion of the hydrocarbon and oxygen of the water, thus introduced with a consequent evolution of power from such combustion; fourth: the formation of water by the chemical reaction; and fifth: the formation of steam from the water with consequent cooling effect.

The operator may by manipulating the valve 48, supply at will a greater or less amount of water to the combustion or impulse chamber. The requisite amount of water may be determined by the action of the engine.

The charging-valve rod 21 is connected with the charging-valve 20 by a pin 49 fixed to the valve eccentrically and operable in a slot 50, in the top of a cap 52 which is screwed into the engine frame or case, to hold the valve in place. The valve rod 21 is operated by a lever 21' pivoted to the engine frame 1 by a pivot 53. Said lever 21' and the pump rod 54 are respectively operated by corresponding mechanisms which transmit motion from the crank shaft 7 and 7', respectively. The parts which transmit power from the crank shaft 7' to operate the pump rod 54 correspond with the charging valve operating parts and are indicated by like characters with the addition of an index.

Referring now to the mechanism for operating the charging valve, 22 is a cam provided with a way 55 in which an antifriction pin 56 engages to operate a slide 57, which is carried in ways 58 on the engine frame and is pivoted at 59 to a slotted lever 60, which is pivotally mounted on a movable fulcrum 62 carried by a link 63 which is operable by a lever 64 pivoted to the engine frame at 65 and adjustably held by a segment 66. The lever 60 is adjustably connected with the valve lever 21' by a slot 67 and the amplitude of the movement of said lever effected by the rotation of the cam 22 is determined by the position of the movable fulcrum 62, which is under the control of the operator by manipulation of the lever 64.

In Fig. 17 the parts just described are shown on a reduced scale, in order to avoid confusion of lines and parts thereof are omitted from Fig. 1 for like reason.

The cam 22 is so constructed as to effect an opening and closing of the charging valve at the appropriate period of the compressor and impulse piston strokes. This will be understood by reference to Figs. 1 and 18, where dotted lines indicate that the charging valve is closed, and by reference to Fig. 17, where it will be seen that the cam way 55 is provided with an inward bend or lobe 68, which is about to engage the pin 56 to thereby shift the slide 57 to the right, to cause a slight movement of the valve pin 49, (shown in Fig. 18), and a consequent opening of the valve. By reference to Figs. 1 and 3, where the parts are shown in the same position as that shown in Figs. 17 and 18, it will be seen that the further rotation of the crank shaft 7 will first effect a further approach of the pistons 6 and 6' to expel the contents of the impulse chamber 3, through the exhaust port 12, shown closed in Fig. 4, but which at this period will be opened by mechanism hereinafter described; and that immediately thereafter the lobe 68 will operate the pin 56, thereby opening the charging valve, which will then be held open by the mechanism until the compressor pistons shall have completed their inward stroke and shall have expelled from the compressor chamber 2 into the impulse chamber 3 the air which had been between them. As the air passes through the charging valve, it takes up the liquid which may be fed to the port by the nozzle 24.

The cam 22' on the crank shaft 7' is arranged correspondingly to the cam 22 and operates through corresponding mechanism to cause the pump 41 to force through the nozzle a determined quantity of fuel each time the charging valve is opened.

The extent to which the charging valve will be opened may be governed by shifting the lever 64 and the length of the stroke of the pump and consequently the amount of liquid thereby delivered to the nozzle may also be governed by adjusting the lever 64'. The amount of water delivered may be governed by adjusting the needle valve 48.

When the engine is operated as above set forth it will generate its maximum power and consume the fuel necessary for such generation.

For the purpose of reducing the consumption of fuel when less power is required, and also for the purpose of supercooling, from time to time if required, I provide the engine with means under the control of the operator by which the delivery of the fuel into the combustion chamber may be effected at every other revolution of the crank shaft instead of at each revolution. The means by which this is accomplished may be understood by reference to Figs. 1, 13 and 20.

The cam 22' is rotatably mounted on the crank shaft 7'. 69 is a yoke for shifting the two gears 70 and 72 which are arranged to separately engage the cam 22' for its rotation. The gears 70 and 72 are respectively connected by a two-to-one gearing 73, and rotate at the relative speeds of two-to-one.

A feather 74 on the shaft 7' causes the smaller gear 70 to rotate with the shaft 7'. When the yoke 69 is shifted to bring the gear 70 into engagement with the cam 22', said cam will rotate at the same speed as the shaft 7', but when the yoke 69 is shifted to cause the gear 72 to clutch with the cam 22', said cam will be driven at half the speed of the shaft 7'. By this means when the gear 70 is clutched with the cam 22' the pump 41 will supply a charge of fuel to the charging valve at each revolution of the crank shaft 7'. When the gear 72 is clutched with the cam 22' a charge of fuel will be delivered and a consequent explosion will occur, at every other revolution of the crank shaft, instead of at every revolution, as before.

Though every other revolution thus occurs without the injection of fuel into the combustion chamber, there is no consequent interruption of the injection of air into such chamber, and therefore a charge of cool air is expanded in and expelled from the combustion chamber at every other revolution, thus effecting a cooling of the combustion chamber that is only possible by the provision herein made for supplying a compressed charge of air to the impulse chamber behind the receding pistons, independently of the fuel supply. Furthermore, the operation of the water supplying means is also independent of the intermittent action of the fuel-supplying device, and consequently, the introduction of water to the combustion chamber in the absence of fuel also assists in the rapid cooling of the chamber.

Provision is made for highly effective air cooling by means most clearly illustrated in Fig. 14 which represents the impulse pistons on the in-stroke.

75 is an air passage opening near the middle of the cylinders and extending thence to the crank chamber 76 into which the compressor and impulse cylinders open. As the piston recedes from the crank shaft, air is sucked in around the cylinder and also into the cylinder behind the piston, and is thus caused to take up the heat of such cylinder. On the return stroke the air is expelled from the crank-case 76 through the air passages 75, thus expelling the heated air. Upon the next in-stroke of the pistons, air is again sucked in, and so on, thus causing an effective cooling by atmospheric media.

The engine may or may not be supplied with a water jacket 77. In case it is so supplied, the same may be applied at the middle of the combustion cylinder, as indicated in Fig. 14, this being the portion of the cylinder which is subjected to the most intense heat. It is to be understood, however, that I do not limit myself to any specific construction of a cooling jacket, either for use of air, water, or both.

Provision may be made for changing the stroke of one of the compressor pistons, and mechanism for accomplishing this purpose is detailed in Figs. 6, 7, 8, 9, 10, 11 and 12, and is also shown in Fig. 1.

78 is a slide mounted on the compressor crank 37' and connected by a crank-pin 79 with another slide 80 which is mounted to move transversely across the axis of a rotatable head 82 which is fixed to a shaft 83 that is journaled to rotate in boxing 84, 85 mounted on a sliding table 86 which is carried in ways 87 in the frame 1. Said ways extend at right angles to the axis of the crank shaft 7'.

88 is a sleeve slidable on and rotating with the shaft 83, and provided with an annular groove 89 and connected by a flexible connection 90 with the free end of the slide 80 which is farthest from the crank pin 79. Said connection passes around suitable antifriction means as a pulley 92. The slide 80 is grooved to receive the connection 90 and by moving the collar 88 along the shaft 83 the end of the slide 80 to which the flexible connection 90 is attached will be drawn toward the axis of the head 82 and will consequently force the crank pin 79 away from such axis.

93 is a bell crank pivoted at 94 to the sliding table 86 and provided on one arm with a pin 95 in the groove 89 of the collar 88, and on the other arm with a pivot 96, by which it is connected with a link 97 that is pivoted at 98 to the frame 1 of the engine. The pin 95 and pivot 96 are equi-distant from the pivot 94.

99 is a lever pivoted by a pivot 100 to the engine frame 1 and operating on an anti-friction roller 101 to force the table 86 and the shaft 83 away from the engine cylinders thereby making such shaft 83 eccentric to the crank shaft 7', so that as the crank shaft rotates, the movement of the slides that carry pin 79 is controlled by the crank 37' and the head 82, thus causing the wrist pin 79 to describe a path eccentric to shaft 7' but having a constant radius on the in-stroke dead center, so that the piston always terminates its in-stroke at the same point.

102 designates a rack to hold the lever in any position to which it may be adjusted. By adjusting the lever 99 the table 86 may be brought to a definite position at which it is desired to hold the collar 88, thus to determine the length of the piston stroke.

By reference to Fig. 11, it will be seen that when the collar 88 is retracted from the head 82 and the crank pin 79 is at dead center for the outmost stroke of the piston 5', said crank pin will be farther from the axis of the crank shaft 7', than when the collar is positioned as shown in Fig. 6. By this arrangement the stroke of the piston 5' may be increased and decreased at the will of the operator and will always terminate at the same point on its in-stroke. To increase the compression, the lever 99 will be adjusted to move the shaft 83 away from the cylinder, thus increasing the stroke of the piston and the amount of air sucked into the cylinder. A reverse movement of the lever will shorten the piston stroke. As the crank shaft is rotated the resistance of the piston 5' and its rod constantly operates to hold the connection 90 taut.

The device is a combination of the two cylinders 2 and 3, the two pairs of pistons 5 and 5', 6 and 6', and their crank connections, with the fly-wheel a, by which means a charge may be delivered between the two pistons 6 and 6' while receding, through the port 4 between the two chambers 2 and 3 by the mutual approach of the pistons 5 and 5' in the chamber 3 by means of an explosion in the explosion-chambers, beginning with the issuing of the first particles of fuel from the charging-port 4, in which port is the rotary-valve 20 having the adjustable fuel-nozzle 24 which delivers fuel and water for vaporization by the air from the compression-chamber as the fuel and water pass into the combustion-chamber and over the hot wire 23 in said chamber; the consequent ignition and combustion being continuous until all the fuel has been delivered into the combustion-chamber, the delivery being positive, and actuated by the cam-driven pump 41 and sucked by the force of the air, respectively.

In the ordinary gas engine the pressure as indicated by indicator diagrams is zero on the charging stroke, is increased gradually on the compression stroke to produce initial compression, then is increased instantly on the firing stroke from such initial compression to maximum compression, and is finally decreased to zero from maximum compression.

In my engine the pressure is slightly increased from zero on the inward stroke of the impulse pistons; and at the beginning of the outward or firing stroke the pressure instantly increases to that in the compressor cylinder; then as the impulse pistons recede from one another on the firing stroke, the pressure is again instantly increased by the ignited portion of the charge; and finally, while the pistons yet further recede from one another, the pressure is increased and maintained for say a third, more or less, of the firing stroke by the continuous ignition of the remainder of the charge. It is thus seen that in effect the charges are slow-burning and their continuous action over a definite period of time is allied to the action of slow-burning powder used in high power ordnance, well-known in that art, and the results produced are obviously the same, viz.,—greater power and less strain on the parts.

What I claim is:—

1. An internal combustion engine provided with a rotary valve at the charging port of the impulse chamber, a nozzle to supply fuel to the inside of the rotary valve, said nozzle being movable to direct the fuel onto the wall of the valve, or into the impulse chamber at the will of the operator, and means to supply compressed air to said valve.

2. An internal combustion engine provided with a hot wire igniter in the impulse chamber opposite the charging port, means to supply fuel to said port, said means being adjustable to direct fuel onto the engine walls, or onto the igniter at the will of the operator, a valve for said port, and means to supply compressed air to said valve.

3. In an internal combustion engine, two parallel cylinders, a port at the middle thereof connecting said cylinders, pairs of pistons in the cylinders, one pair of pistons operating as a pump to supply charges to the other pair of pistons, crank shafts for the pistons, a shiftable connection between one of the pump pistons and its crank shaft, and means to operate the shiftable connection to vary the compression of the charge.

4. In an internal combustion engine, two parallel cylinders, a port at the middle thereof connecting said cylinders, pairs of pistons in the cylinders, one pair of pistons operating as a pump to supply charges to the other pair of pistons, crank shafts for the pistons, a shiftable connection between one of the pump pistons and its crank shaft, a slidably mounted collar to shift the connection to vary the compressing of the charge, and means to slide the collar.

5. In an internal combustion engine, two parallel cylinders, a port at the middle thereof connecting said cylinders, pairs of pistons in the cylinders, one pair of pistons operating as a pump to supply charges between the other pair of pistons, crank shafts for the pistons, a sliding connection between the crank shaft and one of the pump pistons, a shaft, a support for the shaft and shiftable relative to the pump piston, a head to rotate with the shaft and having a sliding connection with said pump piston, a collar shiftable on the shaft and adapted to slide the head relative to said pump piston, means operatable by shifting the support to shift the collar, and means to shift the support.

6. In an internal combustion engine, a compression cylinder and a combustion cylinder mounted side by side, a port connecting the centers of said cylinders, a pair of pistons in the compression cylinder, a pair of pistons in the combustion cylinder, crank shafts and mechanism connecting the pistons together, and mechanism under the control of the operator for sliding one of the compression piston crank pins relative to the crank shaft.

7. In an internal combustion engine, a pair of cylinders, a pair of pistons in each cylinder, a crank-shaft at each end of the cylinders and connecting corresponding pistons together, there being a port connecting the centers of the cylinders, a valve for said port, one of said cylinders being a compression cylinder and the other of said cylinders being a combustion cylinder, a hot wire igniter in the combustion cylinder, an adjustable nozzle for supplying fuel to said port, and means to adjust the nozzle to direct the fuel toward or to the side of the igniter.

8. In an internal combustion engine, a driving shaft, a pair of crank-shafts operatively connected together and to the driving shaft, there being a pair of cranks upon each crank-shaft, a compression-cylinder mounted between the crank shafts, a pair of pistons in the compression cylinder and connected to corresponding cranks upon the crank-shafts, a combustion-cylinder beside the compression cylinder, there being a port connecting the centers of the cylinders; a pair of impulse pistons in the combustion cylinder and connected to corresponding cranks upon the crank shafts, cam mechanism operatable by the driving shaft, valve mechanism operatable by said cam mechanism for adjustably controlling the supply of fuel to said port, and mechanism for slidably adjusting one of the combustion piston crank pins relative to the crank shaft to vary the degree of compression of the charge.

9. In an internal combustion engine, a driving shaft, a pair of crank shafts operatively connected together and to the driving-shaft, there being a pair of cranks upon each crank-shaft; a compression cylinder mounted between the crank-shafts, a pair of pistons in the compression-cylinder and connected to corresponding cranks upon the crank-shafts, a combustion-cylinder beside the compression-cylinder, there being a port connecting the centers of the cylinders; a pair of impulse pistons in the combustion cylinder and connected to corresponding cranks upon the crank-shafts, valve mechanism operatively connected to the driving shaft for adjustably controlling the supply of fuel to said port, mechanism for slidably shifting one of the compression piston crank-pins relative to the crank shaft to vary the compression of the charge; an igniter in the combustion chamber, a rotary valve in the port, and means to rotate the rotary valve, the disposition of said compression pistons relative to said impulse pistons together with the timing of the rotary valve being adapted to admit a part of the compressed charge to the combustion chamber to start the pistons apart, and thereafter to admit the balance of the charge to continue the combustion, so that the greatest compression takes place after the initial combustion to prolong and increase the combustion and thus increase the force of the piston.

10. In a gas engine, an air compressor cylinder, a combustion cylinder, a piston working in each of said cylinders, means to pass a charge of compressed air from the compressor cylinder to the combustion cylinder, and means to adjust said pistons relative to one another for increasing and decreasing the amount of pressure in the compressor cylinder at the time the combustion cylinder receives the charge.

11. In a gas engine, an air compressor cylinder, a combustion cylinder, a pair of pistons working in each of said cylinders, means to pass a charge of compressed air from the compressor cylinder to the combustion cylinder and between the pistons thereof, and means to adjust the pairs of pistons relative to one another for increasing and decreasing the amount of pressure between the compression pistons at the time the impulse pistons begin to separate to receive the charge between them.

12. In a gas engine, an air compressor cylinder, a combustion cylinder, a piston working in each of said cylinders, mechanism operatively connecting said pistons together, means to pass a compressed charge from the compressor cylinder to the combustion cylinder and behind its piston, means on said mechanism to adjust said pistons relative to one another, and indicators on said adjusting means to indicate the positions of the pistons relative to their dead centers.

13. In a gas engine, an air compressor cylinder, a combustion cylinder, a piston working in each of said cylinders, mechanism operatively connecting said pistons together, said mechanism being adjustable to change the length of stroke of the compressor piston at its outer end only, and means to pass a compressed charge from the compressor cylinder to the combustion cylinder and behind its piston.

14. In a gas engine, a compressor cylinder, a combustion cylinder, a piston working in each of said cylinders, there being a port connecting said cylinders; a crank shaft operatively connecting the pistons together, a body rotatable on the crank shaft, a collar fixed to the crank shaft, a pair of friction shoes pivoted to said body, and means to alternately swing said shoes into and out of contact with the collar and thereby rock the crank shaft.

In testimony whereof, I have hereunto set my hand at Los Angeles California this 18th day of September 1907.

CHARLES H. FOX.

In presence of—
  James R. Townsend,
  M. Beulah Townsend.